US012388186B2

(12) United States Patent
Zhang et al.

(10) Patent No.: US 12,388,186 B2
(45) Date of Patent: Aug. 12, 2025

(54) ANTENNA ASSEMBLY

(71) Applicant: HUAWEI TECHNOLOGIES CO., LTD., Shenzhen (CN)

(72) Inventors: Chuanan Zhang, Shenzhen (CN); Yunfei Qiao, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 188 days.

(21) Appl. No.: 18/306,833

(22) Filed: Apr. 25, 2023

(65) Prior Publication Data

US 2023/0261384 A1 Aug. 17, 2023

Related U.S. Application Data

(63) Continuation of application No. PCT/CN2021/124811, filed on Oct. 20, 2021.

(30) Foreign Application Priority Data

Oct. 27, 2020 (CN) ......................... 202011164324.0

(51) Int. Cl.
*H01Q 9/04* (2006.01)
*H01Q 15/00* (2006.01)

(52) U.S. Cl.
CPC ......... *H01Q 9/0485* (2013.01); *H01Q 15/002* (2013.01)

(58) Field of Classification Search
CPC .......... H01Q 15/08; H01Q 21/00; H01Q 1/36; H01Q 13/02; H01Q 15/148; H01Q 3/36; H01Q 3/46; H01Q 15/00; H01Q 3/24-26; H01Q 3/44; H01Q 9/0485; H01Q 15/0006; H01Q 15/002; H01Q 15/242; H01Q 21/245; G02F 1/1333; G02F 1/1347; G02F 1/216; G02F 2203/13; G02F 2202/42; G02F 2201/307
See application file for complete search history.

(56) References Cited

U.S. PATENT DOCUMENTS

2019/0131719 A1* 5/2019 Haziza ..................... H01Q 3/36

FOREIGN PATENT DOCUMENTS

ES 2388213 B2 * 10/2012 ........... G02F 1/1347

* cited by examiner

*Primary Examiner* — Hoang V Nguyen
(74) *Attorney, Agent, or Firm* — Leydig, Voit & Mayer, Ltd.

(57) ABSTRACT

An antenna assembly is provided, including two antenna boards that are placed in a stacked manner. Polarization manners of the two antenna boards are perpendicular to each other, and the two antenna boards are configured to separate a received electromagnetic wave into a horizontal polarization component and a vertical polarization component. A bias voltage is applied to a liquid crystal dielectric layer in the two antenna boards to change ratios of reflection power to transmission power of the two antenna boards, to change a ratio of reflection power of the two polarization components that are obtained through separation, and implement linear polarization at different angles after vector synthesis is performed on the two polarization components. According to the present application, receive power of an antenna is increased.

14 Claims, 3 Drawing Sheets

ANTENNA ASSEMBLY

CROSS-REFERENCE TO RELATED APPLICATIONS

This application is a continuation of International Application No. PCT/CN2021/124811, filed on Oct. 20, 2021, which claims priority to Chinese Patent Application No. 202011164324.0, filed on Oct. 27, 2020. The disclosures of the aforementioned applications are hereby incorporated by reference in their entireties.

TECHNICAL FIELD

Embodiments of this application relate to the field of antenna technologies, and specifically, to an antenna assembly.

BACKGROUND

Electromagnetic waves are information carriers of wireless communication systems. Polarization characteristics of electromagnetic waves determine reception and transmission performance of the communication systems. When electromagnetic wave signals are transmitted in space, transmission, reflection, and the like occur in complex channel environments, such as obstacles. When transmission, reflection, and the like occur, a polarization direction of the electromagnetic wave rotates. Therefore, the polarization characteristics change. The change of the polarization characteristics of electromagnetic waves definitely causes performance of an original communication system to deteriorate.

An antenna is an indispensable part of a complete communication system as a component for transmitting and receiving electromagnetic waves. Polarization characteristics of an antenna are closely related to polarization characteristics of electromagnetic wave signals. A receive antenna and a received electromagnetic wave signal need to have the same polarization, to obtain maximum receive power of signals. In a complex channel environment, the polarization characteristics of electromagnetic waves cannot be obtained clearly. Conventional linear-polarized reconfigurable antennas can implement only horizontal polarization (zero-degree polarization), vertical polarization (90-degree polarization), and 45-degree polarization. Polarization manners of the polarization at special angles are limited. Therefore, a reconfigurable polarization antenna whose polarization can be randomly adjusted is required, to maximize receive power of the communication system.

SUMMARY

Embodiments of this application provide an antenna assembly, to implement a plurality of polarization manners and improve receive power of an antenna.

According to a first aspect, an antenna assembly is provided, including: two antenna boards, where one antenna board is placed above the other antenna board, polarization manners of the two antenna boards are perpendicular to each other, the two antenna boards are configured to separate a received electromagnetic wave into a horizontal polarization component and a vertical polarization component, and the antenna board includes an upper dielectric substrate, a lower dielectric substrate, an upper conductor layer, a lower conductor layer, and a first liquid crystal dielectric layer, where the first liquid crystal dielectric layer is disposed between the upper dielectric substrate and the lower dielectric substrate, the upper conductor layer is disposed on an upper surface of the upper dielectric substrate, the upper conductor layer and the upper dielectric substrate form an antenna radiation structure, the lower conductor layer is disposed on an upper surface of the lower dielectric substrate, the lower conductor layer and the lower dielectric substrate form a phase-shift network structure, the upper conductor layer and the lower conductor layer form a control circuit of the first liquid crystal dielectric layer, and the control circuit is configured to change a ratio of reflection power to transmission power of the antenna board by controlling a voltage of the first liquid crystal dielectric layer. The antenna assembly performs vector synthesis on the horizontal polarization component and the vertical polarization component based on different ratios of reflection power to transmission power of the two antenna boards.

With reference to the first aspect, in some implementations of the first aspect, the horizontal polarization component and the vertical polarization component are synthesized into linear polarization through vector synthesis.

With reference to the first aspect, in some implementations of the first aspect, the linear polarization is linear polarization at any angle.

With reference to the first aspect, in some implementations of the first aspect, the antenna assembly further includes: a second liquid crystal dielectric layer, where the second liquid crystal dielectric layer is disposed above the two antenna boards, an antenna radiation structure of one of the two antenna boards is below the liquid crystal dielectric layer, the second liquid crystal dielectric layer generates different phase shift amounts based on voltages at two ends of the second liquid crystal dielectric layer, and the phase shift amounts are used to change phases of polarization components corresponding to the two antenna boards.

With reference to the first aspect, in some implementations of the first aspect, when the phase shift amount is 0° or 180°, the antenna assembly synthesizes the horizontal polarization component and the vertical polarization component into linear polarization based on different ratios of reflection power to transmission power of the polarization components corresponding to the two antenna boards. When the phase shift amount is 900 and ratios of reflection power to transmission power of the polarization components corresponding to the two antenna boards are the same, the antenna assembly synthesizes the horizontal polarization component and the vertical polarization component into circular polarization. When the phase shift amount is 900 and ratios of reflection power to transmission power of the polarization components corresponding to the two antenna boards are different, the antenna assembly synthesizes the horizontal polarization component and the vertical polarization component into elliptic polarization. When the phase shift amount is not 0°, 90°, or 180°, the antenna assembly synthesizes the horizontal polarization component and the vertical polarization component into elliptic polarization.

According to a second aspect, an antenna is provided, including: two antenna boards and a feed, where one of the two antenna boards is placed above the other antenna board, polarization manners of the two antenna boards are perpendicular to each other, the antenna feed is configured to receive an electromagnetic wave, the two antenna boards are configured to separate the electromagnetic wave into a horizontal polarization component and a vertical polarization component, and the antenna board includes an upper dielectric substrate, a lower dielectric substrate, an upper conductor layer, a lower conductor layer, and a first liquid crystal dielectric layer, where the first liquid crystal dielectric layer is disposed between the upper dielectric substrate and the lower dielectric substrate, the upper conductor layer is disposed on an upper surface of the upper dielectric substrate, the upper conductor layer and the upper dielectric substrate form an antenna radiation structure, the lower conductor layer is disposed on the upper surface of the lower dielectric substrate, the lower conductor layer and the lower dielectric substrate form a phase-shift network structure, the feed is disposed above the two antenna boards, an antenna radiation structure of one of the two antenna boards is below the feed, the upper conductor layer and the lower conductor layer form a control circuit of the first liquid crystal dielectric layer, and the control circuit is configured to change a ratio of reflection power to transmission power of the antenna board by controlling a voltage of the first liquid crystal dielectric layer. The antenna performs vector synthesis on the horizontal polarization component and the vertical polarization component based on different ratios of reflection power to transmission power of the two antenna boards.

With reference to the second aspect, in some implementations of the second aspect, the horizontal polarization component and the vertical polarization component are synthesized into linear polarization through vector synthesis.

With reference to the second aspect, in some implementations of the second aspect, the linear polarization is linear polarization at any angle.

With reference to the second aspect, in some implementations of the second aspect, the antenna further includes a second liquid crystal dielectric layer, where the second liquid crystal dielectric layer is disposed above the feed, an antenna radiation structure of one of the two antenna boards is below the feed, the second liquid crystal dielectric layer generates different phase shift amounts based on voltages at two ends of the second liquid crystal dielectric layer, and the phase shift amounts are used to change phases of polarization components corresponding to the two antenna boards.

With reference to the second aspect, in some implementations of the second aspect, when the phase shift amount is 0° or 180°, the antenna synthesizes the horizontal polarization component and the vertical polarization component into linear polarization based on different ratios of reflection power to transmission power of the polarization components corresponding to the two antenna boards. When the phase shift amount is 900 and ratios of reflection power to transmission power of the polarization components corresponding to the two antenna boards are the same, the antenna synthesizes the horizontal polarization component and the vertical polarization component into circular polarization. When the phase shift amount is 900 and ratios of reflection power to transmission power of the polarization components corresponding to the two antenna boards are different, the antenna synthesizes the horizontal polarization component and the vertical polarization component into elliptic polarization. When the phase shift amount is not 0°, 90°, or 180°, the antenna synthesizes the horizontal polarization component and the vertical polarization component into elliptic polarization.

DESCRIPTION OF EMBODIMENTS

The following describes technical solutions of this application with reference to accompanying drawings.

The technical solutions in embodiments of this application may be applied to various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system or a new radio (NR) system, a device-to-device (D2D) communication system, a machine communication system, an internet of vehicles communication system, a satellite communication system, a future communication system, or the like.

It can be learned from the foregoing that a conventional linear polarization reconfigurable antenna can implement only four types of common linear polarization, and a polarization manner is very limited. In a complex channel environment, polarization rotation may occur in an electromagnetic wave signal, and an angle of polarization rotation is irregular. In order to receive maximum signal power at a receive end, a receive antenna whose polarization can be randomly reconstructed need to be used to receive electromagnetic waves.

Polarization reconstruction is essentially a vector synthesis process. Any polarization can be obtained through synthesis of horizontal polarization and vertical polarization. An example is used. (1) When horizontal polarization and vertical polarization are in a same phase or in an opposite phase, the horizontal polarization and the vertical polarization can be synthesized into linear polarization. Linear polarization at any angle can be implemented by adjusting a ratio of reflection power of the horizontal polarization to reflection power of the vertical polarization. (2) When horizontal polarization and vertical polarization have same amplitude and a phase difference is +90 degrees, the horizontal polarization and the vertical polarization can be synthesized into circular polarization. (3) When horizontal polarization and vertical polarization cannot be synthesized into linear polarization or circular polarization, the horizontal polarization and the vertical polarization can be synthesized into elliptic polarization.

In the following, this application provides an antenna assembly whose polarization can be randomly adjusted.

Figure 1:
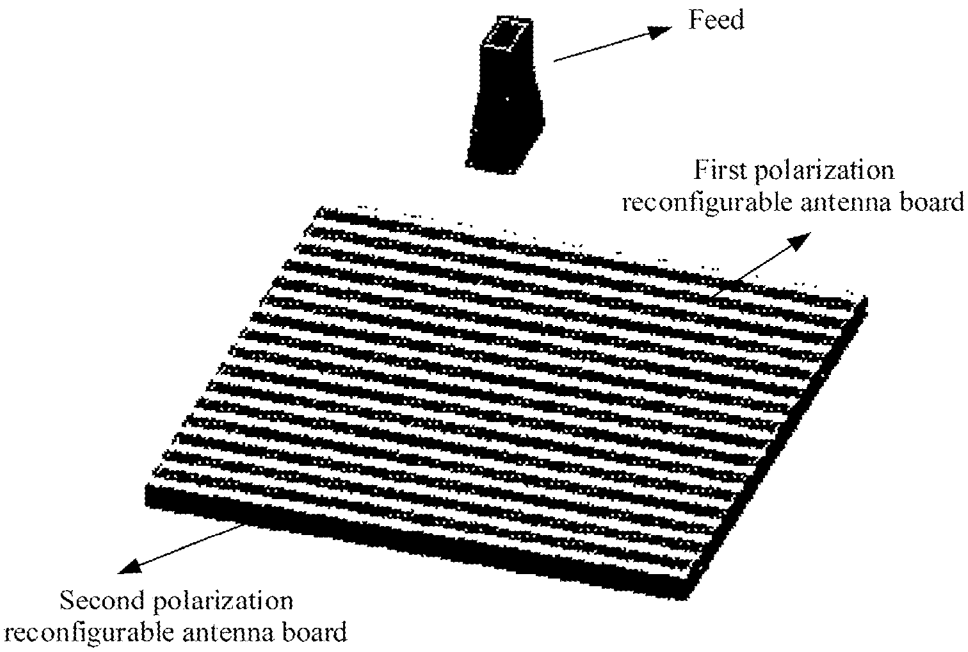
FIG. 1 is a schematic diagram of an antenna assembly according to an embodiment of this application.

Refer to FIG. 1. FIG. 1 is a schematic diagram of an antenna assembly according to this application.

The antenna assembly includes a first polarization reconfigurable antenna board and a second polarization reconfigurable antenna board (that is, an example of the two antenna boards). The first polarization reconfigurable antenna board and the second polarization reconfigurable antenna board are placed in a stacked manner. Polarization manners of the two antenna boards are perpendicular to each other, and the two antenna boards have transmission functions and reflection functions. The two antenna boards are configured to separate a received electromagnetic wave into a horizontal polarization component and a vertical polarization component. For example, the first polarization reconfigurable antenna board may separate a received electromagnetic wave into a horizontal polarization component, and the second polarization reconfigurable antenna board may separate a received electromagnetic wave into a vertical polarization component.

Optionally, the antenna assembly further includes a feed, and the feed is located at a focus position above the first polarization reconfigurable antenna board. A feed is an important part of a reflector antenna, and a function of the feed is to radiate radio frequency power from a feeder to the reflector in a form of an electromagnetic wave, so that a proper field distribution is generated on a diameter, to form a required high-gain beam. Common feeds include: a horn, a dipole, a patch, a tapered slotted antenna (TSA), and the like.

Figure 2:
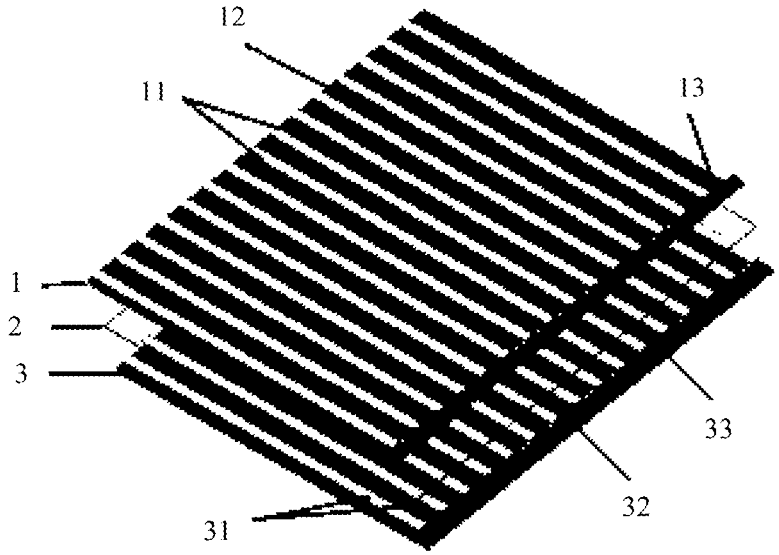
FIG. 2 is a schematic diagram of a first polarization reconfigurable antenna board according to an embodiment of this application.

Refer to FIG. 2. FIG. 2 is a schematic diagram of a first polarization reconfigurable antenna board according to this application. The first polarization reconfigurable antenna board includes an upper printed circuit board (PCB) 1, a liquid crystal dielectric layer 2, and a lower PCB board 3, where the liquid crystal dielectric layer 2 is disposed between the upper PCB board 1 and the lower PCB board 2.

The upper PCB board 1 of the first polarization reconfigurable antenna board includes an upper dielectric substrate 12 and an upper conductor layer, where the upper conductor layer is disposed on an upper surface of the upper dielectric substrate 12. For example, the upper conductor layer includes a metal copper-coated layer 11 and a metal copper-coated layer 13. The lower PCB board 3 includes a lower dielectric substrate 32 and a lower conductor layer. For example, the lower conductor layer includes a metal copper-coated layer 31 and a metal copper-coated layer 33, and the lower conductor layer is disposed on an upper surface of the lower dielectric substrate 32. The metal copper-coated layer 11 and the upper dielectric substrate 12 form an antenna radiation structure of the first reconfigurable antenna board. The antenna radiation structure is a main structure that forms an antenna function, and is used to transmit and receive an electromagnetic wave. The metal copper-coated layer 31 and the lower dielectric substrate 32 form a phase-shift network structure of the first reconfigurable antenna board, to provide phase compensation for an antenna unit. The phase-shift network is required to have a 360-degree phase change capability.

Figure 3:
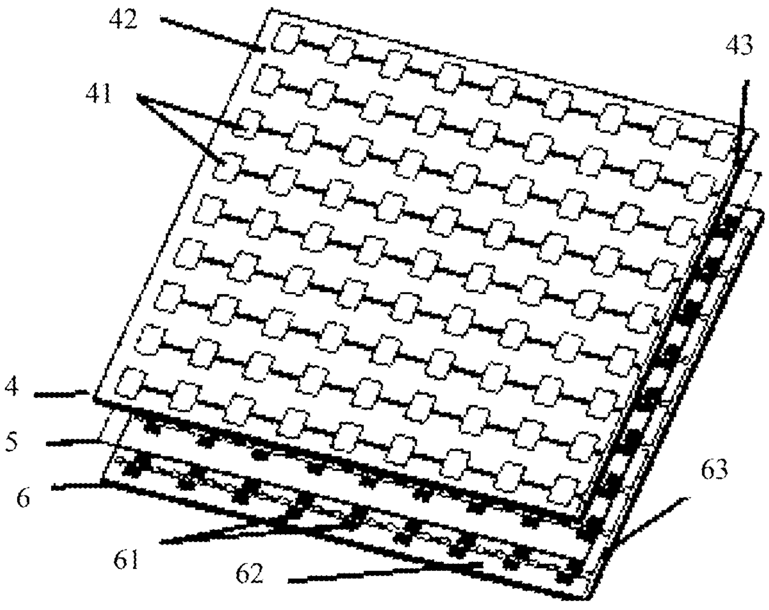
FIG. 3 is a schematic diagram of a second polarization reconfigurable antenna board according to an embodiment of this application.

Refer to FIG. 3. FIG. 3 is a schematic diagram of a second polarization reconfigurable antenna board according to this application. The second polarization reconfigurable antenna board includes an upper PCB board 4, a liquid crystal dielectric layer 5, and a lower PCB board 6, where the liquid crystal dielectric layer 5 is disposed between the upper PCB board 4 and the lower PCB board 6.

The upper PCB board 4 of the second polarization reconfigurable antenna board includes an upper dielectric substrate 42 and an upper conductor layer, where the upper conductor layer is disposed on an upper surface of the upper dielectric substrate 42. The upper conductor layer includes a metal copper-coated layer 41 and a metal copper-coated layer 43. The lower PCB board 6 includes a lower dielectric substrate 62 and a lower conductor layer, where the lower conductor layer includes a metal copper-coated layer 61 and a metal copper-coated layer 63, and the lower conductor layer is disposed on an upper surface of the lower dielectric substrate 62. The metal copper-coated layer 41 and the upper dielectric substrate 42 form an antenna radiation structure of the second polarization reconfigurable antenna board, and the metal copper-coated layer 61 and the lower dielectric substrate 62 form a phase-shift network structure of the second polarization reconfigurable antenna board.

It can be learned from FIG. 2 and FIG. 3 that the first polarization reconfigurable antenna board and the second polarization reconfigurable antenna board have completely the same structure setting, and a difference lies in that conductor layers of the first polarization reconfigurable antenna board are the metal copper-coated layers 11 and 31 of strip conductors, and conductor layers of the second polarization reconfigurable antenna board are the metal copper-coated layers 41 and 61 of a dot-matrix shape.

Figure 4:
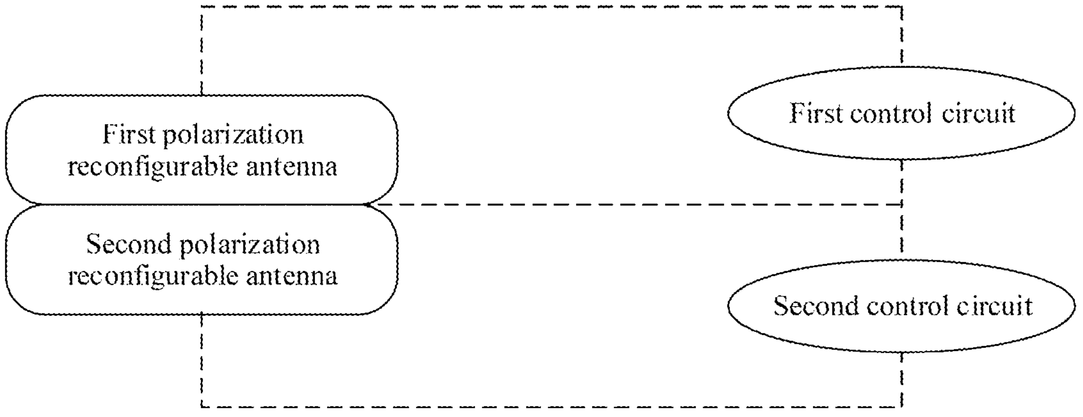
FIG. 4 is a schematic diagram of control circuits of a first polarization reconfigurable antenna board and a second polarization reconfigurable antenna board.

Refer to FIG. 4. FIG. 4 is a schematic diagram of control circuits of the first polarization reconfigurable antenna board and the second polarization reconfigurable antenna board. The upper conductor layer and the lower conductor layer of the first polarization reconfigurable antenna board form a first control circuit of the liquid crystal dielectric layer 2, and the first control circuit is configured to change a ratio of reflection power to transmission power of the first polarization reconfigurable antenna board by controlling a voltage of the liquid crystal dielectric layer 2. The upper conductor layer and the lower conductor layer of the second polarization reconfigurable antenna board form a second control circuit of the liquid crystal dielectric layer 2, and the second control circuit is configured to change a ratio of reflection power to transmission power of the second polarization reconfigurable antenna board by controlling a voltage of the liquid crystal dielectric layer 5. For example, the first polarization reconfigurable antenna board separates a received electromagnetic wave into a horizontal polarization component, and the second polarization reconfigurable antenna board separates a received electromagnetic wave into a vertical polarization component. A voltage of the first control circuit and a voltage of the second control circuit are used to respectively control ratios of reflection power to transmission power of the two antenna boards, to adjust a ratio of reflection power of the horizontal polarization component obtained through separation to reflection power of the vertical polarization component obtained through separation. Then, the adjusted horizontal polarization component and vertical polarization component may be synthesized into linear polarization through vector synthesis.

It may be understood that the antenna assembly can implement linear polarization at any angle based on different ratios of reflection power to transmission power of the two antenna boards at different voltages.

It may be understood that the second polarization reconfigurable antenna board in the antenna assembly has two functions: reflection and transmission, and may cover two directions of the antenna, to increase a coverage area of the antenna.

Figure 5:
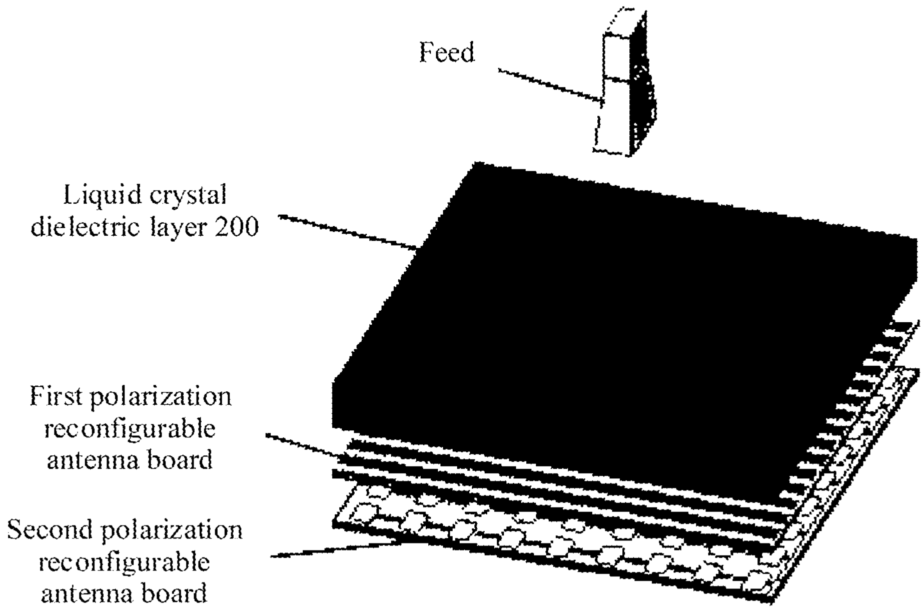
FIG. 5 is a schematic diagram of another antenna assembly according to an embodiment of this application.

Refer to FIG. 5. FIG. 5 is a schematic diagram of another antenna assembly according to this application. A difference between the antenna assembly shown in FIG. 5 and the antenna assembly shown in FIG. 4 lies in that, in the antenna assembly shown in FIG. 5, a liquid crystal dielectric layer 200 (that is, an example of the second liquid crystal dielectric layer) is disposed above the antenna assembly shown in FIG. 4, and an antenna radiation structure of the first polarization reconfigurable antenna board is below the liquid crystal dielectric layer 200. The liquid crystal dielectric layer 200 has a phase shift function only for single polarization, and a phase shift amount is controlled by voltages at two ends of the liquid crystal dielectric layer 200. The liquid crystal dielectric layer 200 generates different phase shift amounts based on the voltages at the two ends of the liquid crystal dielectric layer 200, where the phase shift amount is used to change phases of the horizontal polarization component and the vertical polarization component obtained after separation. In this way, on a basis that the antenna assembly shown in FIG. 4 can change ratios of transmission power to reflection power of the two polarization reconfigurable antenna boards, and then change the phases of the two polarization components, not only linear polarization can be implemented, but also circular polarization and elliptic polarization can be implemented.

Optionally, when the liquid crystal dielectric layer 200 generates a 0-degree or 180-degree phase shift, and the antenna is a linear polarization antenna, a ratio of reflection power of a horizontal polarization component to reflection power of a vertical polarization component is adjusted, and the horizontal polarization component and the vertical polarization component may be synthesized into linear polarization at any angle based on different ratios of reflection power.

Optionally, when the liquid crystal dielectric layer 200 generates a 90-degree phase shift, and reflection power of horizontal polarization is equal to reflection power of vertical polarization, the horizontal polarization component and the vertical polarization component may be synthesized into circular polarization.

Optionally, when the liquid crystal dielectric layer 200 does not generate a 0-degree, 90-degree, or 180-degree phase shift, the horizontal polarization component and the vertical polarization component may be synthesized into elliptic polarization.

Optionally, when the liquid crystal dielectric layer 200 generates a 90-degree phase shift, and reflection power of horizontal polarization is not equal to reflection power of vertical polarization, the horizontal polarization component and the vertical polarization component may be synthesized into elliptic polarization.

Optionally, the antenna assembly in this application may alternatively include a plurality of polarization reconfigurable antenna boards. The plurality of polarization reconfigurable antenna boards may separate an electromagnetic wave into a plurality of polarization components. Reflection power and/or phases of the plurality of polarization components are changed, so that vector synthesis is performed on the plurality of adjusted polarization components, to implement a plurality of polarization manners.

An embodiment of this application further provides a satellite, and the satellite is provided with the antenna assembly in embodiments of this application.

An embodiment of this application further provides a vehicle. The vehicle is provided with the antenna assembly in embodiments of this application. When the antenna assembly provided in this application is applied to the vehicle, a corresponding electromagnetic wave signal can be received in a plurality of polarization manners, thereby improving receive power of a vehicle system.

It should be understood that structures of components in the antenna assembly shown in FIG. 1 to FIG. 5 and connection relationships between components are merely examples for description. Any replaceable component structure that has a same function as each component falls within the protection scope of embodiments of this application.

Embodiments described in this application may be independent solutions, or may be combined based on internal logic. All these solutions fall within the protection scope of this application.

It should be noted that the foregoing descriptions are merely example embodiments of this application. A person skilled in the art may understand that this application is not limited to the specific embodiments described herein, and a person skilled in the art can make various obvious changes, readjustments, mutual combination, and replacements without departing from the protection scope of this application. Therefore, although this application is described in detail by using the foregoing embodiments, this application is not limited to the foregoing embodiments, and may further include more other equivalent embodiments without departing from the concept of this application. The scope of this application is determined by the scope of the appended claims.

What is claimed is:

1. An antenna assembly comprising:

two antenna boards and an antenna feed, wherein one antenna board is placed above the other antenna board, polarization manners of the two antenna boards are perpendicular to each other, such that the two antenna boards are configured to separate a received electromagnetic wave into a horizontal polarization component and a vertical polarization component, and each antenna board comprises:

an upper dielectric substrate, a lower dielectric substrate, an upper conductor layer, a lower conductor layer, and a first liquid crystal dielectric layer, wherein the first liquid crystal dielectric layer is disposed between the upper dielectric substrate and the lower dielectric substrate, wherein the upper conductor layer is disposed on an upper surface of the upper dielectric substrate, the upper conductor layer and the upper dielectric substrate form an antenna radiation structure, the lower conductor layer is disposed on an upper surface of the lower dielectric substrate, the lower conductor layer and the lower dielectric substrate form a phase-shift network structure, wherein the antenna feed is disposed above the two antenna boards, wherein the upper conductor layer and the lower conductor layer form a control circuit of the first liquid crystal dielectric layer, and the control circuit is configured to change a ratio of reflection power to transmission power of each antenna board by controlling a voltage of the first liquid crystal dielectric layer, wherein the antenna assembly performs vector synthesis on the horizontal polarization component and the vertical polarization component based on different ratios of reflection power to transmission power of the two antenna boards, wherein the antenna assembly further comprises a second liquid crystal dielectric layer, and wherein the second liquid crystal dielectric layer is disposed above the two antenna boards, an antenna radiation structure of one of the two antenna boards is below the second liquid crystal dielectric layer, the second liquid crystal dielectric layer generates different phase shift amounts based on voltages at two ends of the second liquid crystal dielectric layer, and the different phase shift amounts are used to change phases of polarization components corresponding to the two antenna boards.

2. The antenna assembly according to claim 1, wherein the horizontal polarization component and the vertical polarization component are synthesized into linear polarization through the vector synthesis.

3. The antenna assembly according to claim 2, wherein the linear polarization is linear polarization at any angle.

4. The antenna assembly according to claim 1, wherein based on the phase shift amount being 0° or 180°, the antenna assembly synthesizes the horizontal polarization component and the vertical polarization component into linear polarization based on different ratios of reflection power to transmission power of the polarization components corresponding to the two antenna boards.

5. The antenna assembly according to claim 1, wherein based on the phase shift amount being 90° and ratios of reflection power to transmission power of the polarization components corresponding to the two antenna boards being the same, the antenna assembly synthesizes the horizontal polarization component and the vertical polarization component into circular polarization.

6. The antenna assembly according to claim 1, wherein based on the phase shift amount being 90° and ratios of reflection power to transmission power of the polarization components corresponding to the two antenna boards being different, the antenna assembly synthesizes the horizontal polarization component and the vertical polarization component into elliptic polarization.

7. The antenna assembly according to claim 1, wherein based on the phase shift amount being not 0°, 90°, or 180°, the antenna assembly synthesizes the horizontal polarization component and the vertical polarization component into elliptic polarization.

8. An antenna comprising:

two antenna boards and an antenna feed, wherein one of the two antenna boards is placed above the other antenna board, polarization manners of the two antenna boards are perpendicular to each other, wherein the antenna feed is configured to receive an electromagnetic wave, such that the two antenna boards are configured to separate the electromagnetic wave into a horizontal polarization component and a vertical polarization component, and each antenna board comprises:

an upper dielectric substrate, a lower dielectric substrate, an upper conductor layer, a lower conductor layer, and a first liquid crystal dielectric layer, wherein the first liquid crystal dielectric layer is disposed between the upper dielectric substrate and the lower dielectric substrate, the upper conductor layer is disposed on an upper surface of the upper dielectric substrate, the upper conductor layer and the upper dielectric substrate form an antenna radiation structure, the lower conductor layer is disposed on an upper surface of the lower dielectric substrate, the lower conductor layer and the lower dielectric substrate form a phase-shift network structure, wherein the antenna feed is disposed above the two antenna boards, an antenna radiation structure of one of the two antenna boards is below the antenna feed, wherein the upper conductor layer and the lower conductor layer form a control circuit of the first liquid crystal dielectric layer, and the control circuit is configured to change a ratio of reflection power to transmission power of each antenna board by controlling a voltage of the first liquid crystal dielectric layer, wherein the antenna assembly performs vector synthesis on the horizontal polarization component and the vertical polarization component based on different ratios of reflection power to transmission power of the two antenna boards, wherein the antenna further comprises a second liquid crystal dielectric layer, and wherein the second liquid crystal dielectric layer is disposed above the two antenna boards, an antenna radiation structure of one of the two antenna boards is below the second liquid crystal dielectric layer, the second liquid crystal dielectric layer generates different phase shift amounts based on voltages at two ends of the second liquid crystal dielectric layer, and the phase shift amounts are used to change phases of polarization components corresponding to the two antenna boards.

9. The antenna according to claim 8, wherein the horizontal polarization component and the vertical polarization component are synthesized into linear polarization through the vector synthesis.

10. The antenna according to claim 9, wherein the linear polarization is linear polarization at any angle.

11. The antenna according to claim 8, wherein based on the phase shift amount being 0° or 180°, the antenna synthesizes the horizontal polarization component and the vertical polarization component into linear polarization based on different ratios of reflection power to transmission power of the polarization components corresponding to the two antenna boards.

12. The antenna according to claim 8, wherein based on the phase shift amount being 900 and ratios of reflection power to transmission power of the polarization components corresponding to the two antenna boards being the same, the antenna synthesizes the horizontal polarization component and the vertical polarization component into circular polarization.

13. The antenna according to claim 8, wherein based on the phase shift amount being 900 and ratios of reflection power to transmission power of the polarization components corresponding to the two antenna boards being different, the antenna synthesizes the horizontal polarization component and the vertical polarization component into elliptic polarization.

14. The antenna according to claim 8, wherein based on the phase shift amount being not 0°, 90°, or 180°, the antenna synthesizes the horizontal polarization component and the vertical polarization component into elliptic polarization.

* * * * *